United States Patent [19]

Youngberg et al.

[11] 4,400,191

[45] Aug. 23, 1983

[54] SPHERE FORMING METHOD AND APPARATUS

[75] Inventors: Charles L. Youngberg, Altadena, Calif.; Charles G. Miller, deceased, late of Pasadena, Calif.; James B. Stephens, La Crescenta; Anthony A. Finnerty, La Canada, both of Calif.

[73] Assignee: The United States of America as represented by the Administrator of the National Aeronautics and Space Administration, Washington, D.C.

[21] Appl. No.: 403,847

[22] Filed: Jul. 30, 1982

[51] Int. Cl.³ .............................................. C03B 19/10
[52] U.S. Cl. ..................................... 65/21.4; 65/21.3; 65/22; 65/142; 264/5; 264/12; 264/14; 425/6; 425/7; 425/10
[58] Field of Search ....................... 65/21.3, 21.4, 142, 65/22; 264/5, 12, 14; 425/6, 7, 10

[56] References Cited

U.S. PATENT DOCUMENTS

| | | | |
|---|---|---|---|
| 2,500,801 | 3/1950 | Church | 65/21.4 X |
| 2,911,669 | 11/1959 | Beckwith | 65/21.3 X |
| 3,056,184 | 10/1962 | Blaha | 65/21.4 |
| 3,361,549 | 1/1968 | Nakajima | 65/21.3 |
| 3,961,927 | 6/1976 | Alderson et al. | 65/21.1 |
| 4,017,290 | 4/1977 | Budrick et al. | 65/21.4 |
| 4,279,632 | 7/1981 | Frosch et al. | 65/21.4 |

OTHER PUBLICATIONS

NASA Tech Briefs, vol. 5, #2, Summer 1980, p. 236 Controlling the Shape of Microballoons.

*Primary Examiner*—Robert L. Lindsay, Jr.
*Attorney, Agent, or Firm*—John R. Manning; Paul F. McCaul; Thomas H. Jones

[57] ABSTRACT

A system is provided for forming small accurately-spherical objects. Preformed largely-spherical objects (18) are supported at the opening of a conduit (16) on the update of hot gas emitted from the opening, so the object is in a molten state. The conduit is suddenly jerked away at a downward incline, to allow the molten object to drop in free fall, so that surface tension forms a precise sphere. The conduit portion that has the opening, lies in a moderate-vacuum chamber 40, and the falling sphere passes through the chamber and through a briefly-opened valve (30) into a tall drop tower (32) that contains a lower pressure, to allow the sphere to cool without deformation caused by falling through air.

21 Claims, 5 Drawing Figures

SPHERE FORMING METHOD AND APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Precisely spherical bodies, and especially those which are hollow and with thin walls, are utilized as targets in inertial confinement fusion reactors, and have other applications as well. One technique for forming precisely spherical bodies is to heat a preformed hollow sphere or a piece of material containing a bubble forming (expansion) agent, to a temperature at which it is molten, and to drop the body so that it moves in free fall to allow surface tension to form it into a sphere. If the body falls through static air, it is subject to deformation by the air resistance. Although a body can be dropped through a vacuum drop tower, difficulties can be experienced by the fact that the body will remain in a vacuum drop tower of reasonable height, for only a short period of time, so it is desirable to form the body as close to a perfect sphere as possible before it is dropped and begins cooling. Also, it is desirable to avoid sudden gusts of gas in the drop tower, that would be encountered if the vacuum drop tower were suddenly opened to gas at atmospheric pressure in order to admit the molten body. A method and apparatus for forming rounded objects such as spheres, with high precision, and in a relatively simple manner, would be of considerable value.

High temperature melts are very difficult to process without contamination, because they tend to corrode the crucibles that contain them. High-purity melts are important in the fabrication of semiconductor devices and many other applications. A method and apparatus that could contain a melt during processing, without contamination, would be of considerable value.

SUMMARY OF THE INVENTION

In accordance with one embodiment of the present invention, a method and apparatus are provided for effectively forming precision spherical objects or the like. An initial object can be supported on the updraft of hot gas emitted from an opening in a conduit, until it is in a liquid, or molten state. The conduit is then rapidly displaced from under the molten object to allow it to drop in free fall, so the object can solidify without being touched by a solid object.

In order to prevent distortion of the falling molten object by air currents, a chamber is provided that initially partially surrounds the object, as when it is supported by an updraft of gas, and the chamber is maintained in a partial vacuum condition. A vacuum drop tower is positioned under the path of the falling object, and a valve is provided between the chamber and drop tower. The valve opens for a brief period of time to admit the falling object to the drop tower, and then closes to minimize the entrance of gas from the partial vacuum of the chamber into the lower pressure of the drop tower. Foamed oil is provided at the base of the drop tower to cushion the fall of the object.

In order to process low or high-temperature melts without contamination, a chamber is provided that partially surrounds an initial object that is to be melted. The object is supported within the chamber on an updraft of gas. Melting of the object is accomplished by warming the gas, the chamber, or both. In this case, the chamber may or may not be maintained in a vacuum condition or at an appreciable pressure.

The novel features of the invention are set forth with particularlty in the appended claims. The invention will be best understood from the following description when read in conjunction with the accompanying drawings.

DESCRIPTION OF THE PREFERRED EMBODIMENTS

Figure 1:
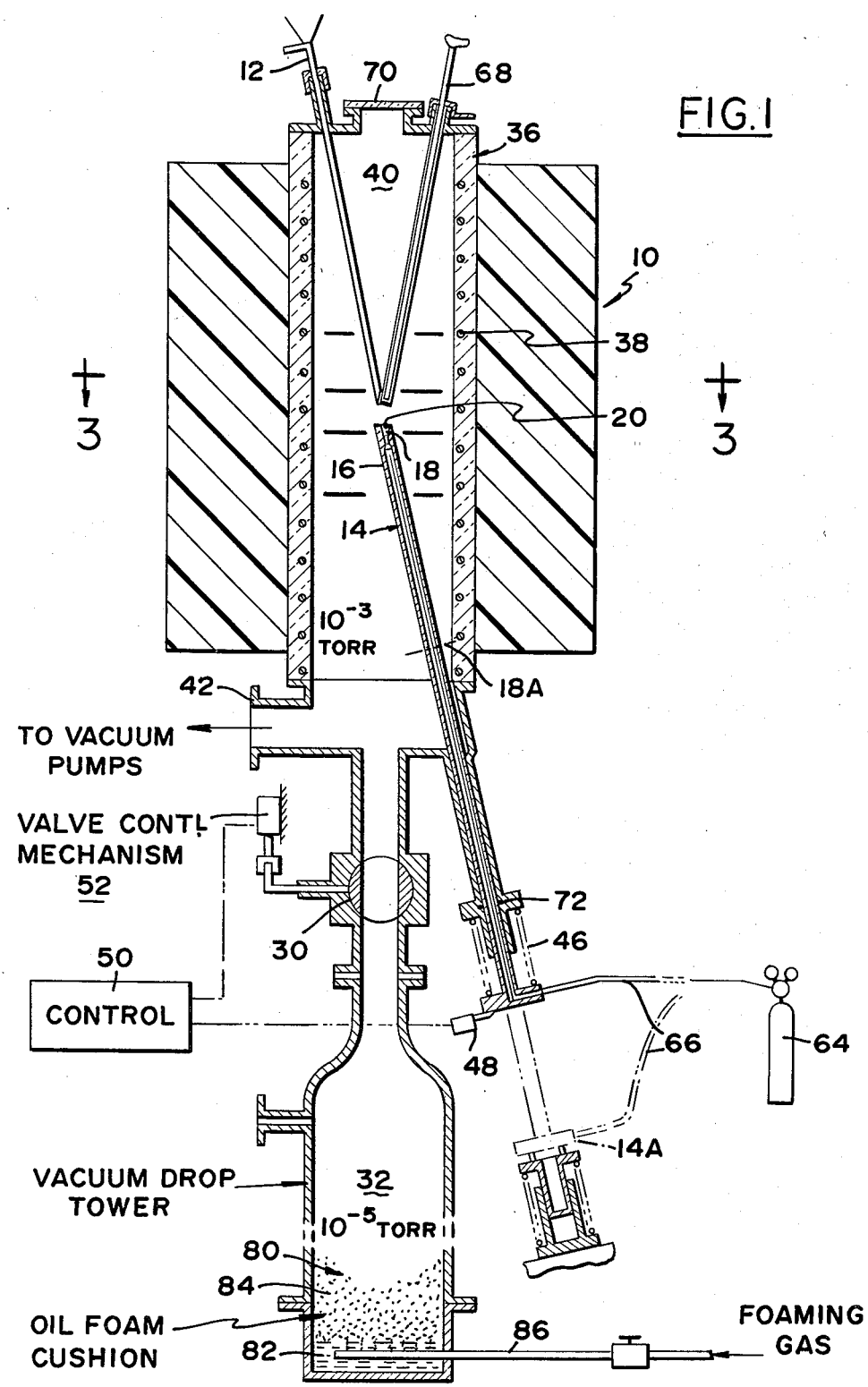
FIG. 1 is a sectional side elevation view of a sphere forming apparatus constructed in accordance with the present invention.

FIG. 1 illustrates a system 10 which receives solid or hollow glass spheres that are not precisely spherical, and which forms each of them into a precisely spherical shape. The initial irregular solid or hollow body is fed through a tube 12 onto a levitator 14 which includes a conduit 16 with an opening 18 out of which gas flows. The initial irregularly-spherical body 20 is supported on the updraft of gas emitted from the opening 18. The emitted gas is hot, to raise the temperature of the object 20 to its molten state, so that surface tension can form the object into a more precisely spherical shape. By avoiding direct contact of the molten object with any solid, large local deformations resulting from such contact are avoided.

After the object at 20 has become molten, it is released to drop in free fall. This is accomplished by rapidly moving the tube 16 downwardly and to the side, by thrusting the levitator at a downward incline from the position 14 to position 14A at which the opening at 18 has moved to the position indicated at 18A. The molten object then falls through a valve 30 into a vacuum drop tower 32. The object falls a large height along the drop tower, so that when it reaches the bottom of the tower it has been cooled to a temperature at which it is solid. Since the spherical object does not encounter substantial air resistance during its fall through the tower, natural surface tension forces cause the final object to have a precisely spherical shape, and radiation thermal losses cause the object to cool to solidification.

WHen the object at 20 is supported on an updraft of gas from the levitator 4, the region containing the object is enclosed in a sealed oven 36. The oven includes a heating element 38 that helps raise the temperature of the object 20 to its molten temperature, or at least avoids radiation cooling of the object. The oven also forms a vacuum chamber 40. Maintenance of a vacuum is accomplished by connecting a port 42 of the chamber to vacuum pumps. The maintenance of a vacuum is useful in avoiding deformation of the molten sphere during its initial drop towards the valve 30 at the top of the drop tower, and in avoiding bursting due to the internal-external object gas pressure difference. The vacuum is also useful in minimizing the inflow of gas into the drop tower, and in minimizing turbulent gas flow conditions that would occur if such a large influx of air were to occur.

Despite the connection of the chamber at 42 to vacuum pumps, only a moderate vacuum such as $10^{-3}$ torr may be maintained in the chamber, since gas is continuously fed into the chamber thorugh the levitator tube opening 18. By contrast, the drop tower 32 is maintained at a higher vacuum such as $10^{-5}$ torr. The valve 30 which connects the chamber and drop tower, is normally maintained in a closed state. It is open for a brief period of time, by opening shortly before the falling object reaches the valve and closing immediately thereafter.

The levitator 14 is rapidly moved out of the way of the sphere at 20, by a spring 46. A latch 48 initially prevents levitator movement. However, an electrical pulse to the latch 48 causes it to release the levitator so the spring can rapidly move it along a downwardly incline. A sliding "0" ring 72 seals the levitator to the chamber to prevent the flow of air into the chamber while allowing levitator movement. A control 50 operates the latch 48 and then operates a valve control mechanism 52 that briefly opens the valve 30.

Figure 2:
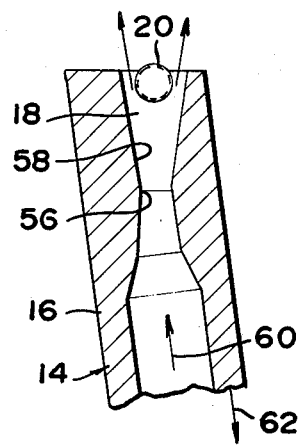
FIG. 2 is a view of a portion of a conduit in the system of FIG. 1.
Figure 3:
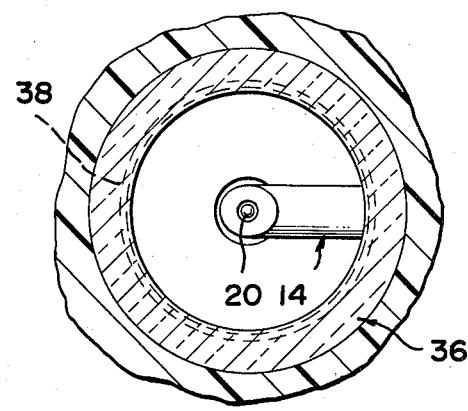
FIG. 3 is a view taken on the line 3—3 of FIG. 1.

As also shown in FIG. 2, the opening 18 at the top of the levitator tube 16, is a DeLaval nozzle with a throat at 56 and an expansion section 58 extending upwardly from the throat. The object 20 is somewhat smaller than the opening 18 along the expansion region 58, so that it nestles in the expansion region. The position of the object 20 along the expansion section 58 of the nozzle is determined by the gas flow, in the direction indicated by arrow 60. Since the area enclosing the object at 20 is a vacuum, and the object 20 may be very light as where it is a thin-walled hollow sphere, only a very small flow rate of gas is required to support the object 20.

The flow take is further reduced by supporting the object 20 so that it lies at least partially within the opening 18, and therefore partially blocks the outflow of gas from the nozzle. Of course, such a low flow rate helps to maintain a vacuum in the chamber 40.

When the levitator 14 is moved out of the way, it is accelerated along the length of the tube 16, in the direction of arrow 62, which extends at only a small angle from the vertical such as about 8°. Since the nozzle expansion section 58 has walls that diverge, rapid acceleration of the levitator does not cause any portion of the nozzle to contact the object 20 even if it is closely nestled in the nozzle. The levitator should be accelerated at a downward incline fast enough so that the object at 20 dropping in free fall (with an acceleration of one G) does not catch up with the levitator until the levitator has moved out of the way.

The gas flow is obtained from a tank 64 of a gas such as nitrogen, and which is connected through a flexible hose 66 to the levitator tube. The flow rate is adjusted to a very low level that is just sufficient to reliably levitate the object. Among other parts of the system, are a gas cooled endoscope 68 that enables viewing of the object at 20, and a window 70 that also aids in such viewing.

As the object falls through the vacuum drop tower 32, it cools by radiation of heat to the walls of the drop tower, while the object is accelerating to a large valocity. A cushion 80 is provided at the bottom of the drop tower to catch the falling, hardened spherical object without damaging it. The cushion includes an oil bath 82 and a mass of oil foam 84 lying above the bath. A foaming gas is applied through an inlet 86 to the oil bath, to form bubbles that contain the foaming gas and that have extremely thin walls of oil. Since the drop tower contains a high vacuum, the foaming gas is applied at a very low pressure. A low vapor pressure oil is utilized, of the type commonly used in diffusion pumps, such as type DC-704 silicone based oil sold by Dow Corning. A foaming gas such as nitrogen applied at a pressure of a few microns of mercury pressure above the pressure of about $10^{-5}$ torr in the drop tower, can be applied. The oil foam mass 84 is preferably maintained at a height considerably greater than that of the spherical object diameter, so that previous spherical objects that have been cushioned by the oil foam and that float on the oil bath 82, will not be hit by subsequent falling spherical objects.

A sphere 20 of glass of a diameter of one millimeter can be heated to a temperature such as 1,000° C. at which it is soft and pliable, by a flow of gas through the levitation tube 16 which is applied at a pressure such as 100 microns of mercury above the pressure in the chamber 40. The walls of the chamber are also maintained at an elevated temperature such as 1,000° C. After several seconds, the levitator is moved down and to the side by jerking it at a downward incline, to allow the softened sphere to drop in free fall. During its drop through the oven 38, it is free of the updraft of gas that can cause slight distortions, so that the sphere assumes a more nearly perfect spherical shape. As soon as the levitator is snatched downwardly, the valve 30 is opened for a brief time such as one-tenth second, and is then closed to pass the sphere.

A drop tower of ten stories height permits the sphere to fall for a period of almost three seconds. During this time, the sphere is cooled by radiation of its heat to the walls of the drop tower. For larger spheres, the walls of the drop tower can be cooled to cryogenic temperatures to assure that the sphere is in a substantially hardened state when it reaches the bottom of the tower. The fairly low vacuum in the chamber 40 avoids distortions while the spherical object is moving at a relatively low speed, while the much better vacuum in the drop tower avoids distortion while the object is moving at much higher speeds. It may be noted that while a vacuum drop tower can avoid distortions of a spherical object, techniques have been developed to create a downward flow of gas through a tall converging tube to avoid relative movement of a falling object with respect to a gas surrounding it, by having the gas that surrounds the object move at a downward acceleration of about one G.

Figure 4:
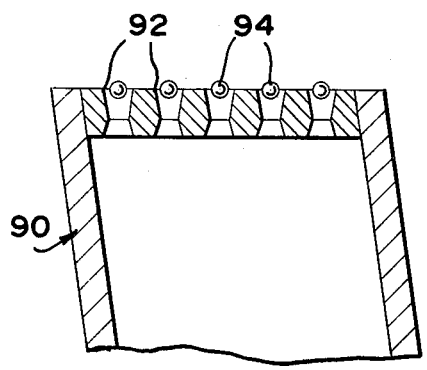
FIG. 4 is a partial sectional view of a conduit constructed in accordance with another embodiment of the invention.
Figure 5:
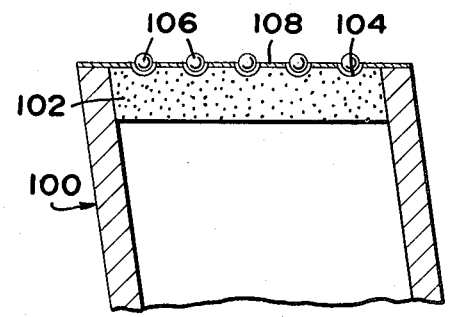
FIG. 5 is a partial sectional view of a conduit constructed in accordance with another embodiment of the invention.

A group of spherical objects can be processed and/or precisely formed at the same time, by utilizing a levitator of the type shown at 90 in FIG. 4. The levitator has a group of nozzles 92 similar to that of FIG. 2, to support a group of rounded objects 94 nestled in the nozzles. FIG. 5 shows another levitator 100 which includes a porous plate 102 with a group of recesses 104 therein into which rounded objects 106 can be placed. Gas flows through the porous plate and into the recesses to levitate the objects as they are heated. It may be noted that the gas can be heated along the levitation tube by a heating element therein, as well as by directly heating the porous plate as with a heating element embedded therein. The recesses 104 are formed to closely receive the rounded objects, to minimize the gas that flows into the chamber. A foil 108 with holes therein aligned with the recesses 104, is attached to the top of the porous plate to minimize the escape of gas between the recesses.

Although the hollow spheres are empty or filled with very low pressure gas, they can be later filled with high pressure gas. This can be accomplished by well known techniques wherein the spheres are placed in a high pressure chamber for an extended period, to allow gas migration into the spheres. It also may be noted that the inner and outer spherical surfaces of a still molten sphere can be made more concentric, where required, by the known technique of vibrating the falling sphere. This can be accomplished by applying a varying electrostatic field to the falling sphere, or a varying magnetic field in the case of spheres of magnetic material.

The above systems are useful not only to produce precisely spherical objects, but also to process materials free of contact with a container which might contaminate the material. This is especially applicable to semiconductor materials used in electronic devices. In such processing, the system 10 of FIG. 1 can receive a solid pellet that is supported on an updraft of inert gas. The pellet is melted by heating the levitating gas and heating the chamber. After processing, the molten object can be slowly cooled by slowly reducing the temperature of the gas and chamber, or rapidly cooled by jerking away the gas-emitting nozzle and allowing the object to drop through a cool tower.

Thus, the invention provides a method and apparatus for forming rounded objects such as spheres, with high spherical precision, and for processing melts without contamination from enclosing crucibles or containers. This is accomplished by supporting the molten or liquid (i.e., flowable) object at an opening in a conduit, by flowing gas in a largely vertical direction out of the conduit opening to support the object on the updraft of gas. To form rounded objects with high spherical precision, the conduit is then rapidly displaced sidewardly with respect to the levitated object, to allow the object to fall. Where the walls of the conduit open end partially surround the levitated object, the conduit can be moved downwardly and to the side, as by jerking it along a downward incline. It may be noted that it is also possible to displace only the object, as with pulses of gas, but it is then harder to control the free fall path of the object. The object can be initially loaded in a solid state onto the conduit open end position, while hot gas flows to the conduit to heat the object to its molten temperature. The region containing the object while it is levitated on an updraft of gas, can be enclosed by a chamber maintained at a moderate vacuum and lying over a vacuum drop tower. As the object drops in free fall, a valve can be temporarily opened to allow the object to fall from the chamber into the drop tower, where the drop tower contains higher vacuum than the chamber. The object impact can be cushioned at the bottom of the tower by an oil foam mass.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for forming a rounded object, comprising:

supporting the object in a largely molten state at an opening in a conduit, including flowing gas in a largely upward vertical direction out of said conduit opening to support the object on the gas flow; and rapidly sidewardly displacing said conduit relative to said object, to allow said object to fall in a vacuum chamber to solidify the object during freefall.

2. The method described in claim 1 wherein:

said step of flowing includes flowing hot gas, of a temperature which is at least the temperature at which the object is in a substantially molten state, out of said conduit opening.

3. The method described in claim 1 wherein:

said step of displacing includes moving said conduit at a downward incline, to move the walls of said opening simultaneously downwardly and to the side so the body can fall free of the conduit.

4. The method described in claim 1 including:

maintaining a valve, which connects to a vacuum drop tower, at a position under said object when said object is supported above said conduit opening, so that when the object falls, it falls to said valve, including initially maintaining said valve closed; and opening said valve shortly before said object falls to said valve, and closing said valve shortly after the object drops therethrough.

5. The method described in claim 1 including:

gently stopping said object, including maintaining a liquid oil bath under the falling object, and applying a gas to said oil to form a foam at the top of said liquid bath to cushion the fall of the object.

6. The method described in claim 1 wherein:

said step of supporting the object includes maintaining a vacuum in the region which contains said object when it is supported at the conduit opening; and said step of supporting the object also includes feeding said object onto the top of an upwardly facing nozzle which forms said conduit opening, wherein said nozzle has a throat below its top and an expansion section extending upwardly from the throat, while flowing gas upwardly through the nozzle at a rate which is greatly enough to support the object away from the walls of the nozzle, but which is small enough to maintain the object at least partially nestled in the nozzle, whereby to minimize gas flow into said region.

7. The method described in claim 1 wherein:

said conduit includes a porous member with at least one recess of about the same size as said object, the pores at said recess forming said conduit opening, and said gas is flowed through said pores at said recess at a rate which supports the objects at least partially nestled in the recess.

8. A method for forming a rounded object, comprising:

supporting an object on the updraft of hot gas emitted from an opening of a conduit lying under the object;

rapidly moving the conduit out from under said object and allowing the object to move downward in free fall, including moving the conduit both downwardly and sidewardly; and cooling to solidify the object during freefall in a vacuum chamber.

9. The method described in claim 8 wherein:

said conduit includes a tube that extends at an incline from the vertical, and which has an upper end forming said opening; and said step of rapidly moving the conduit includes moving said tube primarily along its length, at a downward incline.

10. Apparatus for forming rounded objects, comprising:

walls forming a conduit with an opening which is oriented to emit gas in a largely upward direction;

means for flowing gas through said conduit to emit the gas from said opening, to support an object at said opening;

means for moving the portion of said conduit which contains said opening, suddenly out of the free fall path of an object supported at said conduit opening to allow the object to fall; and walls forming a chamber that surrounds an object supported at said conduit opening; means for establishing a vacuum in said chamber.

11. The apparatus described in claim 10 including:

a drop tower lying under said chamber at the portion thereof which contains an object at said conduit opening, said tower containing a vacuum;

a valve connecting said chamber and said drop tower; and means for opening and closing said valve, to pass an object in free fall from the chamber to the drop tower and then close off access between them.

12. The apparatus described in claim 11 including:

an oil foam disposed at the lower end of said tower, including oil bubbles containing gas at nearly the low pressure in said tower.

13. The apparatus described in claim 10 including:

an object located at said conduit opening; and means for providing hot gas which is emitted from said opening, at a temperature at least about as great as the molten temperature of said object.

14. The apparatus described in claim 10 wherein:

said conduit includes a tube extending along an incline and having an upper end forming said opening; and said means for moving includes means for rapidly accelerating said tube downwardly along said incline.

15. The apparatus described in claim 10 including:

a largely spherical object; and wherein said conduit opening includes a nozzle with a throat and with an expansion section extending upwardly from said throat, said nozzle being of a size to closely receive said object.

16. The apparatus described in claim 10 wherein:

said conduit includes a wall with a recess and a porous wall area leading to said recess, to flow gas into said recess to support an object partially nestled therein.

17. Apparatus for forming a spherical object comprising:

walls forming a chamber and a drop tower under said chamber;

vacuum pump means for maintaining a vacuum in said chamber and in said tower;

a conduit located in said chamber, said conduit having an upwardly facing outlet;

means for flowing hot gas through said conduit and out of said outlet, to support an object on the updraft of gas from said outlet;

means for jerking said conduit at a downward incline, to allow a supported object to fall; and means for briefly opening said valve to allow a falling object to pass from the chamber to the drop tower.

18. In a drop tower of claim 17, the improvement of means for cushioning an object falling through the tower, comprising:

an oil bath lying in the lower end of said tower, and bubbles of gas having walls of oil, lying on said oil bath.

19. The improvement described in claim 18 including:

means for dropping a plurality of objects of a predetermined diameter through said drop tower; and wherein said bubbles extend to a height above said oil bath, which is greater than the diameter of said objects, whereby a previously-dropped object floating on said oil bath will not be hit by another object.

20. A method for processing a material at elevated temperatures at which it is molten, while avoiding contamination by direct contact with a crucible or other container, comprising:

applying the material in a solid form to the opening of a conduit, and flowing gas in a largely upward vertical direction out of said conduit opening to support the object on the gas flow;

heating the material to a temperature at which it is molten, including heating said gas; and cooling said material in a vacuum chamber during freefall to a temperature at which it is substantially solid.

21. The method described in claim 20 wherein:

said step of cooling includes rapidly displacing said conduit relative to said material while it is molten, and allowing the material to fall through a region which is at a lower temperature than the melting temperature of the material.

* * * * *